(No Model.)
D. R. BROWN.
HORSE DETACHER.
No. 411,709. Patented Sept. 24, 1889.
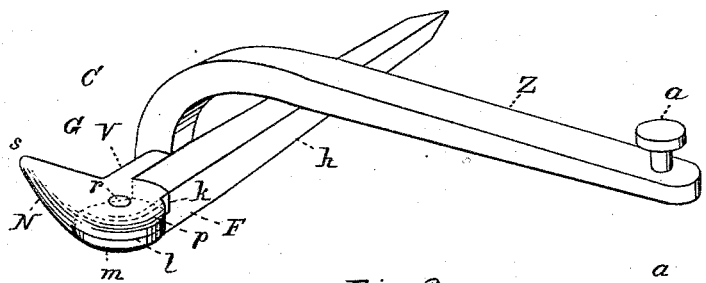
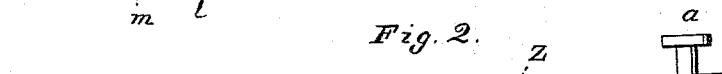
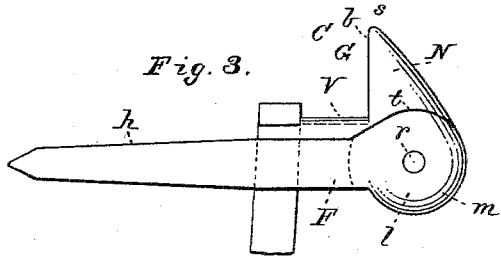
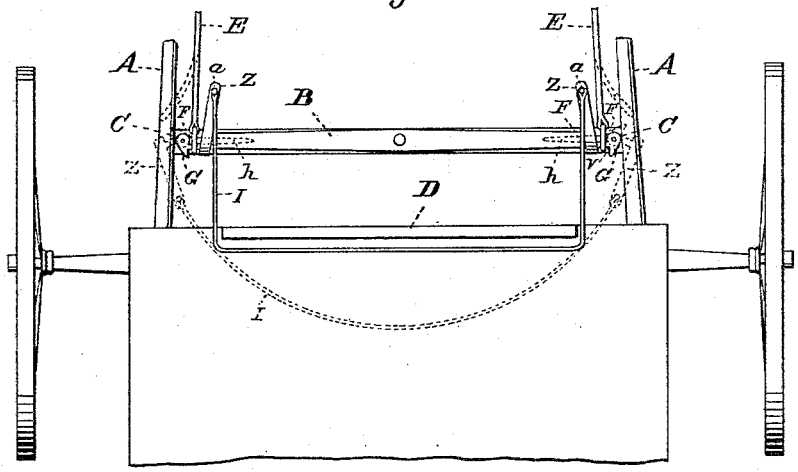
WITNESSES:
Villette Anderson.
Mary Lapkins.
INVENTOR
David Richardson Brown.
BY
E. W. Anderson
ATTORNEY

UNITED STATES PATENT OFFICE.

DAVID R. BROWN, OF PACOLET, SOUTH CAROLINA.

HORSE-DETACHER.

SPECIFICATION forming part of Letters Patent No. 411,709, dated September 24, 1889.

Application filed February 7, 1889. Serial No. 299,035. (No model.)

*To all whom it may concern:*

Be it known that I, DAVID R. BROWN, a citizen of the United States, and a resident of Pacolet, in the county of Spartanburg and State of South Carolina, have invented certain new and useful Improvements in Horse-Detachers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of this invention, and is a perspective view. Fig. 2 is a side view. Fig. 3 is a bottom view, a portion being broken away. Fig. 4 is a top view.

The object of the invention is to provide an efficient horse-detaching device; and the invention consists in the novel construction and combination of devices, all as hereinafter set forth, and pointed out in the appended claims.

In the accompanying drawings, the letter A designates the shafts, and B the singletree, of a buggy or other vehicle having a dash or front board D.

C represents the trace-catches at the end of the singletree, and E the traces.

The trace-catch C consists of the bearing attachment F and the lever-hook G. The bearing attachment F has a squared portion or shank $h$, which is designed to be secured to the end of the singletree, and this shank is extended at its outer end beyond the shoulder $k$ to form the broad bearing $l$, which is rounded, as shown, in circular form. The bearing is beveled around its lower edge, usually as indicated at $m$.

The lever-hook G is formed with the flattened hook portion N, which is circularly rounded in front, as at $p$, to form a broad body to fit on the bearing $l$ of the attachment F, to the center of which it is pivoted, as at $r$. This hook projects rearward in the form of a beveled point $s$, which extends from a concave shoulder $t$ on the under side of said hook. The hook-shoulder engages the circular margin of the bearing $l$ and protecting the pivot. From the hook portion N extends inward alongside the shank $h$ a short connection V, which is provided at its inner end with the overcurved lever-arm Z, which extends upward, forward, and slightly inward nearly at right angles to the connection V of the hook portion. A small button or stud $a$ is provided on the end of the lever-arm to receive the opening in the end of the operating-strap I, which extends back around the dash into the body of the vehicle. The inner edge $b$ of the catch-point $s$ is in line, or nearly so, with the shoulder of the attachment F, and the connection V, which forms the bearing for the trace-eye when slipped over the point is therefore well inside of the pivotal center at $r$. Therefore when the trace is in position and the horse is drawing steadily the catch-point is held in engaged position by the strain on the connection V back of the shank of the attachment.

Should it become necessary to detach the traces to allow the horse to leave the shafts, the operating-strap is pulled, drawing the lever-arms Z inward and rearward and turning the catch-hooks N outward and forward. In this action the eyes of the traces are by the movement of the rounded fronts of the hook portions toward the projecting portions of the shanks stripped from said hooks, so as to be entirely detached from the same.

Having described this invention, what I claim, and desire to secure by Letters Patent, is—

1. The horse-detacher consisting of the attachment F, having the broad bearing end $l$, and the lever-hook G, having the hook portion N, pivoted to said end bearing, the inwardly-extending connection V, and the overcurved lever-arm Z, extending from said lever-connection, substantially as specified.

2. In a horse-detacher, the shouldered attachment F, adapted to be secured to the end of a singletree and having the broad end bearing $l$, and in combination therewith the lever-hook G, consisting of the hook portion N, pivoted to said end bearing and having its inner edge in line with the shoulder of the attachment, the connection V, extending inward therefrom, and the forward overcurved lever-arm Z, provided with an operating-strap, substantially as specified.

In testimony whereof I affix my signature in presence of two witnesses.

DAVID R. BROWN.

Witnesses:
W. A. McFALL,
J. B. FELLERS.